No. 794,682. Patented July 11, 1905.

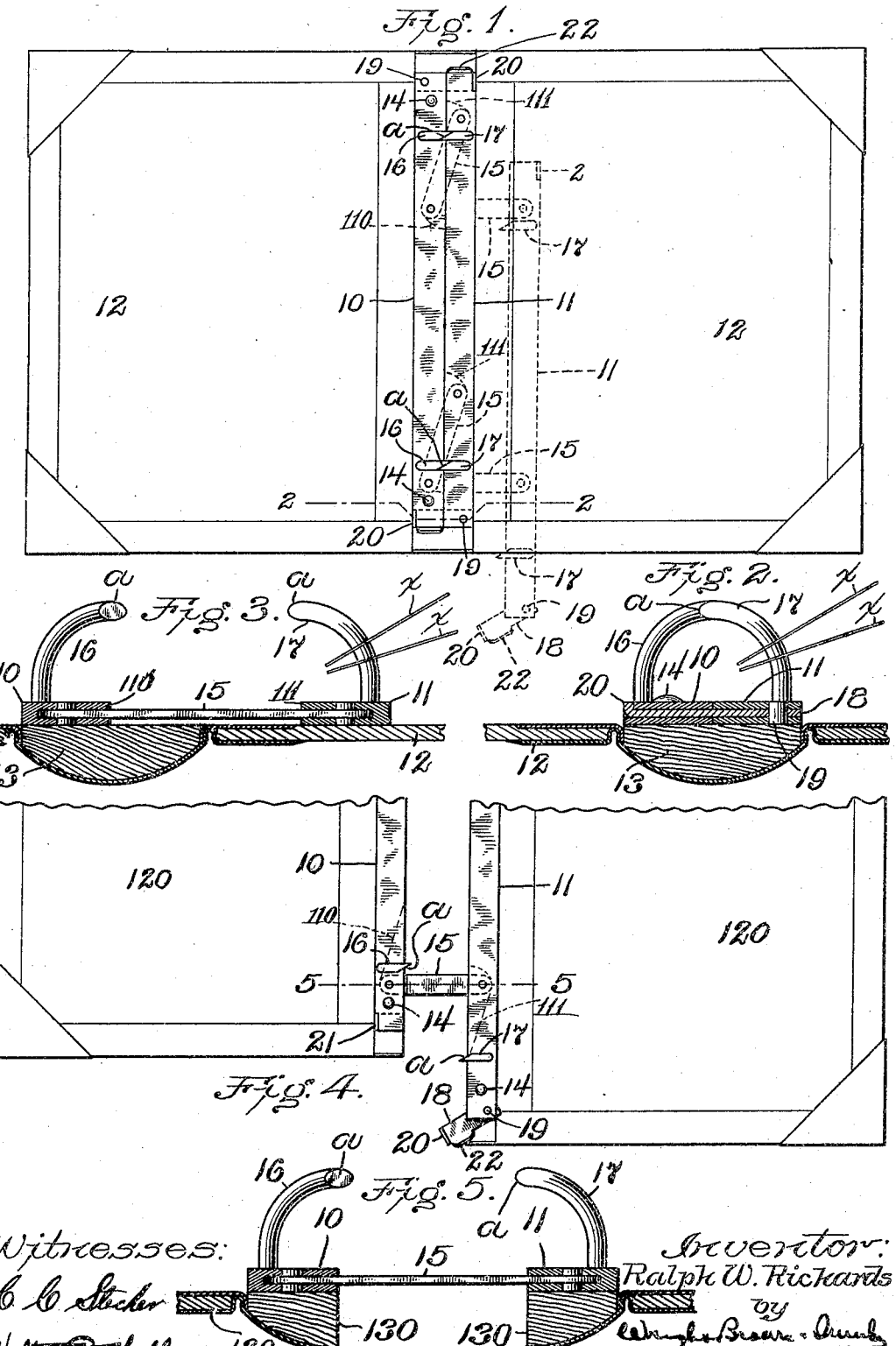

UNITED STATES PATENT OFFICE.

RALPH W. RICHARDS, OF WATERVILLE, MAINE.

LOOSE-LEAF BINDER.

SPECIFICATION forming part of Letters Patent No. 794,682, dated July 11, 1905.

Application filed November 16, 1904. Serial No. 232,988.

*To all whom it may concern:*

Be it known that I, RALPH W. RICHARDS, of Waterville, in the county of Kennebec and State of Maine, have invented certain new and useful Improvements in Loose-Leaf Binders, of which the following is a specification.

This invention relates to loose-leaf binders or devices adapted to maintain a plurality of leaves of paper in the form of a book and adapted to permit the detachment of any one or more leaves therefrom. Devices of this nature are becoming more and more in demand in modern systems of bookkeeping and the filing of records, &c.

The chief object of the present invention is to provide a loose-leaf binder which shall positively secure the several leaves in a compact form when closed and to afford the greatest possible facility when open by which a leaf or leaves may be removed.

The device is so constructed as to provide smooth and easy guides on which the leaves may be turned without incurring injury by contact with the device.

The device shown is extremely simple in construction and operation, attractive in appearance, and easily attachable to a suitable cover.

On the accompanying drawings, Figure 1 illustrates a loose-leaf binder incorporated with a suitable unitary cover. Fig. 2 is a section on the line 2 2 of Fig. 1. Fig. 3 is a section of the device in its open position on the line of the lower connecting-link. Fig. 4 shows the device attached to a separable cover in open position. Fig. 5 is a section on the line 5 5 of Fig. 4.

The same reference characters indicate the same parts wherever they occur.

Referring first to Figs. 1, 2, and 3, it will be seen that the binder, comprising two members or bars 10 11, is installed in a simple folding cover 12, having a rigid back edge 13, to which the bar 10 is affixed by rivets or studs 14. Pockets 110 and 111 are formed in the inner edges of the bars 10 and 11 to receive pivoted links 15 15, by which the bars are connected together. By reason of the link connection the bars 10 and 11 have the same relation to each other as the two halves of a link-connected parallel ruler, and when the bars are closed together the links are entirely incased and concealed within the pockets. (See Fig. 1.) The leaves or sheets to be bound in the cover 12 are held by holders 16 17, which protrude from the bars 11 and 12, respectively, and project through the leaves near their inner edges. Said holders are composed, preferably, of round rods or wire and are separable. The holders 16 and 17 are arranged in couples, each being in the form of a quadrant curved toward its complemental holder. The ends thereof meet above the dividing-line of the bars 10 11, thus forming an arc of approximately one hundred and eighty degrees, and are formed to produce a beveled lap-joint. This form of joint proves to be very smooth and enables the leaves to be slid from one quadrant to the other without being torn or injured in passing. The ends of the bars 10 and 11 are provided with fasteners 18 18, pivoted at 19, which serve to lock the bars together when closed. An upturned lip 20 on the end of each fastener is adapted to enter a notch 21 in the opposite bar, and so prevent the bars from spreading. (See Figs. 1, 2, and 4.) In order to remove or insert a leaf, the bars, and consequently the holders 16 17, may be separated by swinging the fasteners 18 outwardly, as shown in Fig. 4 and in dotted lines in Fig. 1, and so disengaging the lips 20 from the notches 21. An upturned lip 22 is formed on the outer edge of each fastener, so that a finger-nail or any thin-edged article may be inserted for that purpose. As previously stated, the bar 10 only is fastened to the back 13, so that when the bars are separated, as shown by dotted lines in Fig. 1, the bar 11 swings on the links 15 15 relatively to the bar 10 and the cover 12. When in its open position, the bar 11 swings below the bottom edge of the cover, carrying with it the holders or quadrants 17. The holders 17 are thus moved bodily not only away from the holders 16, but they are moved out of line therewith. The leaves or sheets *x*, if divided so that some remain upon one half of the device and some upon the other half, may be removed from either half. The position of the holders 17 being out of line of the holders 16 renders the leaves readily removable from either half without liability of being caught by the holders protruding from the other bar. The links 15 when in open position are firmly braced between their pivots by the overlapping portions of the members 10 and 11.

In Figs. 4 and 5 the device is shown attached to a separable cover composed of two halves 120 120 and a split back having halves 130 130. In this form each of the bars 10 and 11 is attached to one of the halves 130 by studs 14 14. When closed, the appearance of the complete binder is the same as that shown in Figs. 1, 2, and 3, except that the dividing-line between the halves 130 is visible. When open, as in Figs. 4 and 5, the halves 120 120 separate bodily with the bars 10 and 11.

The device, exclusive of the cover, which may be as plain or elaborate as desired, is manifestly simple, inexpensive, convenient, and of minimum bulk and may be attached to any cover in a few moments by inserting the studs 14 or screws which may be used in lieu thereof. The fact that the body of the device is extremely thin and flat makes it especially adapted to note-books, since it does not form a prominent obstacle to the hand should one wish to write in the book when assembled. The form of the device also causes the covers and leaves to lie perfectly flat when open.

Having thus explained the nature of the invention and described a way of constructing and using the same, although without attempting to set forth all of the ways in which it be made or all of the modes of its use, I declare that what I claim is—

1. A device of the character described comprising two parallel metallic bars movable toward and from each other, two or more links pivoted to and connecting said bars, said links being of the same length and maintaining said bars in parallel relation one to the other, and a plurality of leaf-holders supported by said bars, each of said leaf-holders extending upwardly from its supporting-bar and curving toward a complemental leaf-holder on the other supporting-bar, and being beveled at its free end to produce, with its complemental leaf-holder, a beveled lap-joint when said bars are in closed relation.

2. A device of the character described comprising two complemental separable halves of a book-cover, two members each affixed to one of the halves of said book-cover, means connecting said members and adapted to maintain parallel relation between said members, said means being adapted to be concealed within said members when the latter are in closed relation, means carried by one or both of said members for locking said members together when the latter are closed together, and leaf-holders carried by both of said members and adapted to abut against each other when said members are closed together to produce a continuous closed arc.

In testimony whereof I have affixed my signature in presence of two witnesses.

RALPH W. RICHARDS.

Witnesses:
C. C. STECHER,
WALTER P. ABELL.